(12) United States Patent
Citro et al.

(10) Patent No.: US 10,724,595 B2
(45) Date of Patent: Jul. 28, 2020

(54) SHOCK ABSORBING DEVICE (71) Applicants: Saes Getters S.p.A., Lainate (IT); GRUPPO ROLD S.p.A., Nerviano (IT)

(72) Inventors: Marco Citro, Varese (IT); Stefano Alacqua, Como (IT)

(73) Assignees: SAES GETTERS S.P.A., Lainate MI (IT); GRUPPO ROLD S.P.A., Nerviano (MI) (IT)

( * ) Notice: Subject to any disclaimer, the term of this patent is extended or adjusted under 35 U.S.C. 154(b) by 0 days.

(21) Appl. No.: 16/464,599

(22) PCT Filed: Sep. 4, 2018

(86) PCT No.: PCT/IB2018/056738
§ 371 (c)(1),
(2) Date: May 28, 2019

(87) PCT Pub. No.: WO2019/049025
PCT Pub. Date: Mar. 14, 2019

(65) Prior Publication Data
US 2019/0360548 A1 Nov. 28, 2019

(30) Foreign Application Priority Data
Sep. 6, 2017 (IT) .................. 102017000099700

(51) Int. Cl.
*F16F 7/00* (2006.01)
*A41D 31/28* (2019.01)
(Continued)

(52) U.S. Cl.
CPC .............. *F16F 7/003* (2013.01); *A41D 31/28* (2019.02); *A42B 3/124* (2013.01); *F16F 1/025* (2013.01);
(Continued)

(58) Field of Classification Search
CPC .... F16F 7/003; F16F 1/025; F16F 2224/0258; F41H 1/02; A41D 31/28; A41B 3/124; F42D 5/045
(Continued)

(56) References Cited

U.S. PATENT DOCUMENTS 2,239,062 A * 4/1941 Tallmadge ............. A47C 31/04
5/247
2,829,880 A * 4/1958 Staples .................... A47C 7/30
267/142

(Continued)

FOREIGN PATENT DOCUMENTS

DE 10 2012 204 059 B3 6/2013
WO WO 2016/203344 A1 12/2016

OTHER PUBLICATIONS

International Search Report (PCT/ISA/210) issued in PCT/IB2018/056738, dated Dec. 19, 2018.
(Continued)

*Primary Examiner* — Melanie Torres Williams
(74) *Attorney, Agent, or Firm* — Birch, Stewart, Kolasch & Birch, LLP (57) ABSTRACT

The present invention relates to a shock absorbing device incorporating a plurality of wavy shaped elements made of a superelastic material arranged in a crossing pattern, wherein pairs of crests or troughs of said wavy shaped elements made of a superelastic material are restrained to each other in a locking manner by way of connecting elements.

20 Claims, 5 Drawing Sheets

(51) Int. Cl.
*A42B 3/12* (2006.01)
*F16F 1/02* (2006.01)
*F41H 1/02* (2006.01)
*F42D 5/045* (2006.01)

(52) U.S. Cl.
CPC ............... *F41H 1/02* (2013.01); *F42D 5/045* (2013.01); *F16F 2224/0258* (2013.01)

(58) Field of Classification Search
USPC .................................. 267/147, 142, 179, 174
See application file for complete search history.

(56) References Cited

U.S. PATENT DOCUMENTS

| | | | | |
|---|---|---|---|---|
| 5,549,285 A * | 8/1996 | Collins | ..................... | F16F 7/14 248/570 |
| 6,530,564 B1 | 3/2003 | Julien | | |
| 6,629,688 B1 * | 10/2003 | Sebert | ....................... | F16F 1/02 267/147 |
| 8,262,068 B1 * | 9/2012 | Monson | .................. | F16F 1/373 267/160 |
| 8,613,431 B1 * | 12/2013 | Deloy | ....................... | F16F 7/14 248/570 |
| 2004/0195743 A1 * | 10/2004 | Pfau | ........................ | A47C 7/285 267/142 |
| 2014/0304877 A1 | 10/2014 | Fonte et al. | | |
| 2015/0216317 A1 * | 8/2015 | DeFranks | ............ | A47C 27/065 5/719 |
| 2016/0069410 A1 * | 3/2016 | Citro | ........................ | F16F 7/14 188/377 |
| 2018/0120062 A1 * | 5/2018 | Citro | ........................ | F41H 1/08 |

OTHER PUBLICATIONS

Written Opinion of the International Searching Authority (PCT/ISA/237) issued in PCT/IB2018/056738, dated Dec. 19, 2018.

* cited by examiner

SHOCK ABSORBING DEVICE

The present invention generally relates to shock absorbing systems and more particularly to an improved shock absorbing device configured to be integrated in human body protection systems. The invention also relates to human body protection systems incorporating said improved shock absorbing device.

In the design and manufacturing of human body protection systems not only impact resistance, but also comfort needs to be properly considered. Light shock absorbing devices having a high energy absorption ability and at the same time a structure that may be easily deformed, e.g. bent or curved, are more and more desired. This in fact allows to adapt a shock absorbing device to a specific shape and to integrate it in a system or assembly such as e.g. the back and headrest of a vehicle seat. In the case of human body protection systems such as e.g. bullet-proof vests, not only can a shock absorbing system be more easily integrated in a given structure, but an enhanced freedom of movement may also be ensured to a user. Needless to say that comfort is often in contrast with impact resistance, i.e. energy absorption degree.

Shock absorbing devices comprising a plurality of slender elements preferably made of a superelastic alloy are e.g. described in EP 2992240 and in the international patent application WO 2016/203344, both in the Applicant's name. According to these documents the slender elements are restrained at different points of a continuous layer having a backing function. The slender elements may be flat laminar sheet elements and/or straight filiform or wire elements that are arranged so as to absorb the energy of impact forces acting in a direction that is coaxial or coplanar thereto. Impact energy is absorbed by exploiting the so-called buckling effect of slender structures.

Further shock absorbing devices exploiting the so-called buckling effect of slender structures are also known, wherein slender elements in the form of wires made of a superelastic material are woven together and inserted between continuous backing layers made of an impact resistant material. Shock absorbing devices of this type are described e.g. in the patent applications US 2014/0304877 and US 2013/0298317.

The backing layer or layers of prior art shock absorbing devices like those mentioned above are generally rigid structures having the purpose to withstand and spread the impact forces on a high number of slender elements which undergo buckling thereby absorbing the related impact energy. However, due to their rigid configuration the backing layers do not always work synergistically with the slender elements and may define preferential deformation or bending directions that do not allow to fully exploit the buckling effect for energy absorption.

Moreover, in the case of body garments and more generally wearable shock absorbing equipment, the backing layers of prior art shock absorbing devices allow a limited air exchange with the outer environment, which is poorly comfortable for a user.

The purpose of the present invention is therefore to provide an improved shock absorbing device suitable to overcome the drawbacks mentioned above with reference to the prior art. This problem is solved by a shock absorbing device according to the independent claim 1. Preferred features of the present invention are recited in the dependent claims.

In a first aspect thereof the invention consists in a shock absorbing device comprising a plurality of elements made of a superelastic material and having a wavy shape featuring a plurality of crests and troughs between which straight portions are arranged. The superelastic elements are arranged so as to form a pattern wherein their crests and/or troughs cross each other forming a plurality of pairs of crests and/or troughs. The "and/or" language means that the pattern comprises at least crossing throughs or crossing crests, but it may also comprise both crossing crests and crossing troughs.

The shock absorbing device also comprises a plurality of connecting elements configured to restrain in a locking manner a number of pairs of crossing crests or troughs, each element locking between 1 and 72 pairs, while leaving the straight portions free to move.

In an operating condition of the shock absorbing device, the connecting elements are arranged such that impact forces are received substantially perpendicularly thereto and act in a direction that is coaxial or coplanar to the straight portions of the superelastic elements. This allows to absorb impact energy by exploiting their buckling effect similarly to the devices described in the prior art documents mentioned above.

The wavy shaped elements may have e.g. U shaped crests and troughs or, alternatively, sine, square, triangular, trapezoid shaped crests and troughs. Since the superelastic elements are real objects, their wavy shape may depart from the ideal shape of a geometric wave as those mentioned above and the wave length may not be perfectly uniform. However, this does not affect operation of the shock absorbing device according to the invention.

Thanks to these features it is possible to make a shock absorbing device whose structure is very effective in absorbing impact energy and at the same time highly deformable, e.g. bendable, and hence suitable to be integrated in human body protection systems and more generally shock absorbing systems having a complex shape.

The connecting elements may be blocks made of a rigid material such as e.g. plastic, a light metal like aluminum, glass wool, a carbon or aramid composite.

Alternatively, the connecting elements may be in the form of weld spots. In this case the crests or troughs crossing each other can be joined with or without the addition of a welding material.

It will be appreciated that weld spots may be used to restrain only single pairs of crossing crests or troughs, whereas blocks may restrain one or more pairs of crossing crests or troughs depending on their size.

It will also be appreciated that the invention is not limited to any specific number of connecting elements. In fact the lower limit of the range mentioned above refers to a condition wherein a connecting element restrains a single pair of crossing crests or troughs, while the upper limit of the range refers to a condition wherein a connecting element restrains seventy two pairs of crossing crests or troughs.

The present invention will be further disclosed in the following by way of a detailed description of some embodiments thereof. In the description reference will be made to the figures of the attached drawings, wherein:

FIG. 4b is a schematic representation of the photo of the shock absorbing device in FIG. 4a.

In the drawings the size of some components of the shock absorbing device has been altered so as to improve readability and understanding of the invention.

FIGS. 1, 1A, 2 and 3 show a shock absorbing device 10 according to an embodiment of the invention. The shock absorbing device 10 comprises e.g. twenty wavy shaped elements 11, 11', ..., 11", 12, 12', ..., 12", that are e.g. in the form of wires made of a superelastic material. The superelastic material is e.g. Nitinol and the wires may have a diameter of e.g. 0.6 mm.

The wavy shaped elements 11, 11', ..., 11", 12, 12', ..., 12", feature a plurality of crests and troughs between which straight portions are arranged. The crests and troughs have e.g. a U shape and are arranged so as to form e.g. a pattern having the shape of a rectangular grid 6×14, wherein their crests cross each other substantially perpendicularly forming 84 pairs. The crests of each pair are restrained to each other in a locking manner by a respective connecting element e.g. in the form of a block 13, 13', ..., 13", made of a rigid material such as e.g. polycarbonate or acrylonitrile butadiene styrene (ABS), light metals such as aluminum, glass wool, carbon or aramid composites. The present invention is not limited to any specific material for the rigid blocks.

Figure 1:
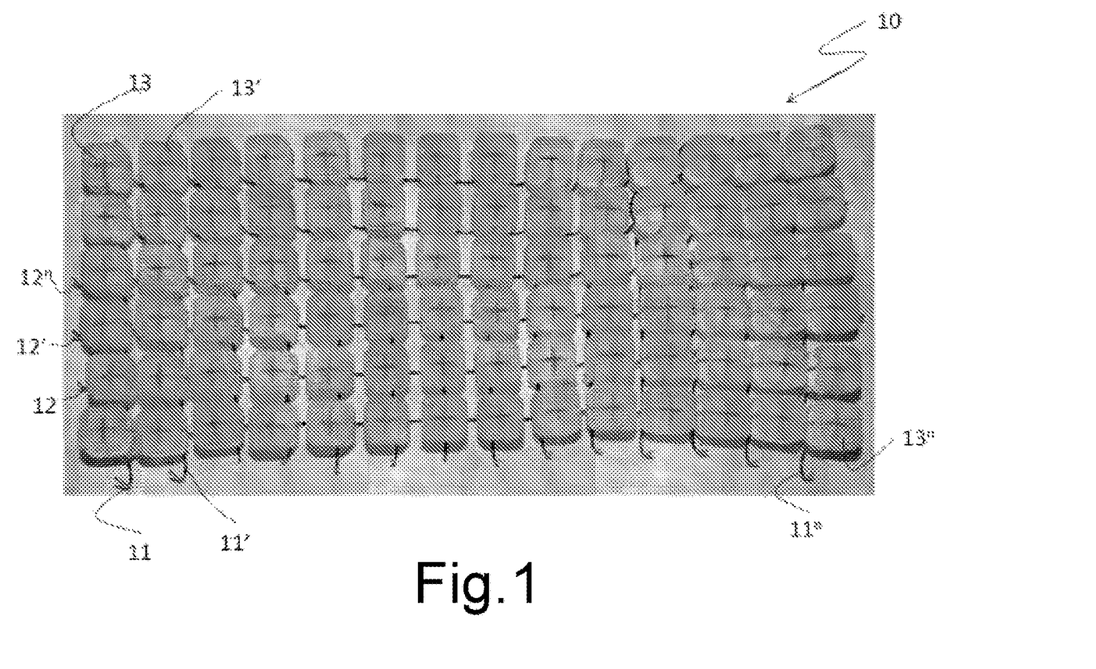
FIG. 1 is a photo showing a top view of a shock absorbing device according to an embodiment of the present invention in a substantially flat configuration.
Figure 1A:
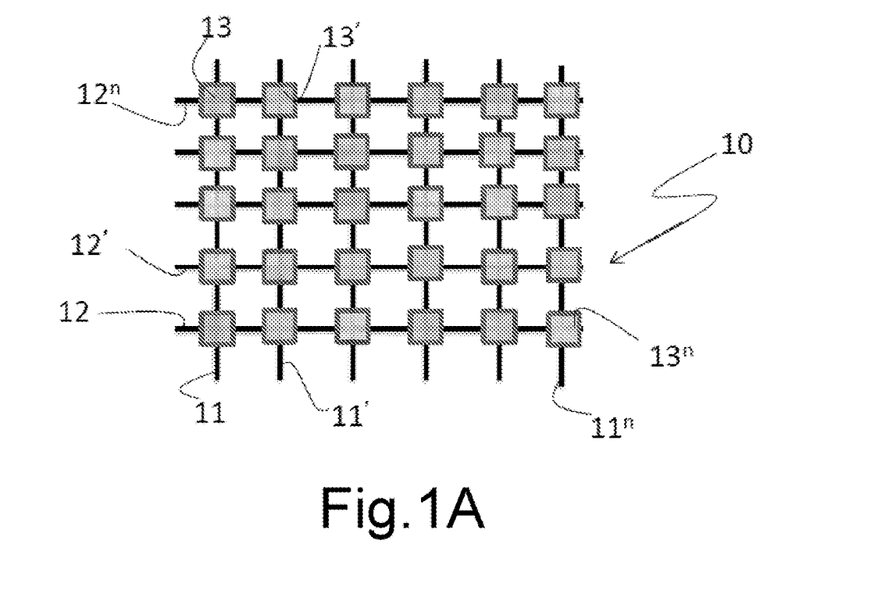
FIG. 1A is a schematic representation of the shock absorbing device of FIG. 1.
Figure 2:
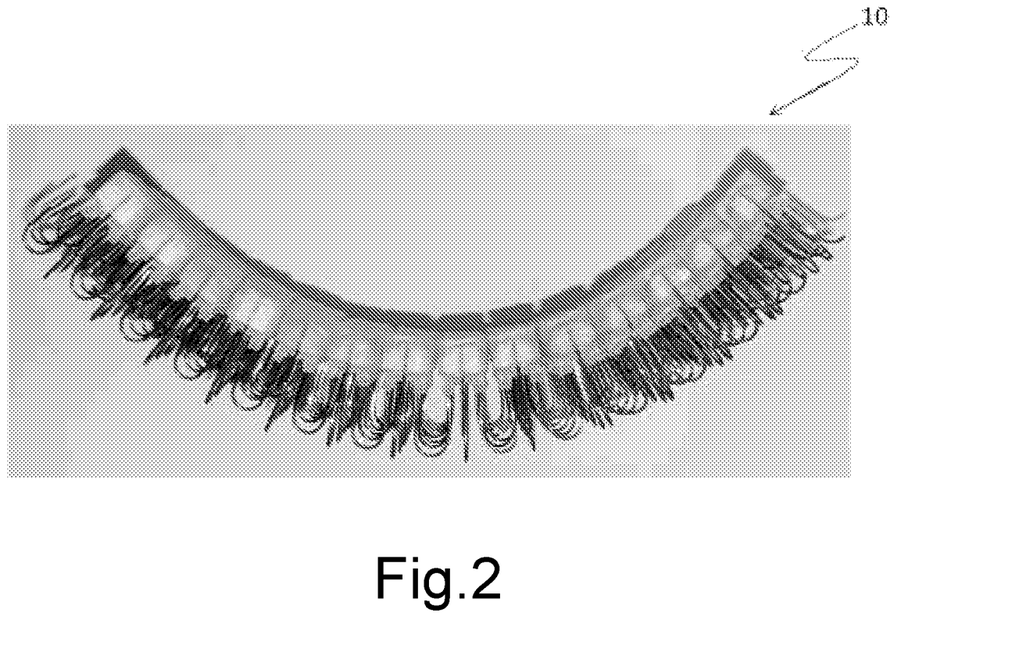
FIG. 2 is a photo showing a side view of the shock absorbing device of FIG. 1 in an arched configuration.
Figure 3:
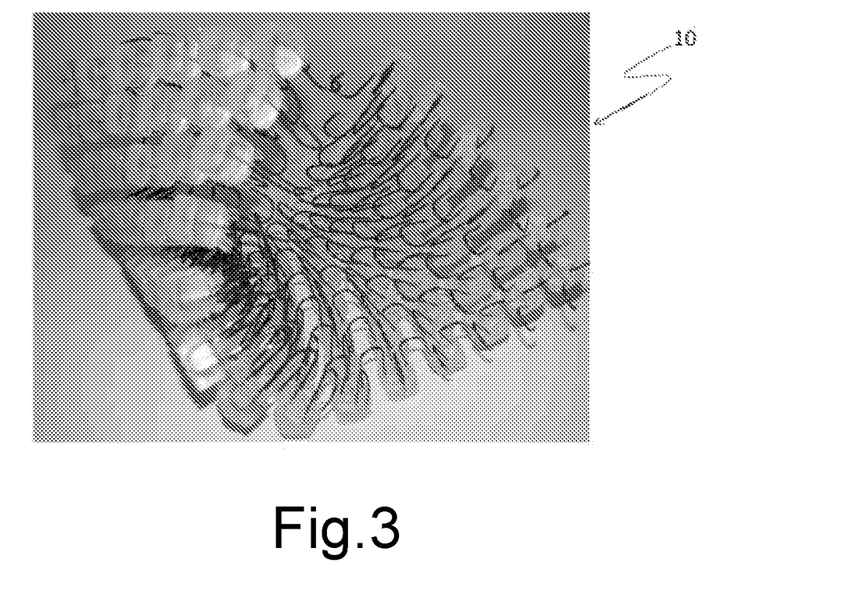
FIG. 3 is a photo showing a side view of the shock absorbing device of FIG. 1 system in a warped configuration.

The device according to the embodiment of the invention shown in FIGS. 1 to 3 has e.g. a substantially rectangular shape having a size of 6 cm×13 cm and a height of 2 cm, and featuring eighty four pairs of crests joined by as many respective blocks. The photos of the prototype shown in FIGS. 1, 2 and 3 have been enlarged in order to better appreciate its features.

The superelastic, wavy shaped elements can be wires having a circular or rectangular cross section or tubes having an inner diameter ranging from 0.2 mm to 2 mm. Preferred are superelastic elements in the form of wires with a circular cross section having a diameter comprised between 250 and 1000 µm. Since the superelastic elements are real objects, their cross sections might not be perfectly circular, so the term "diameter" is to be intended as the diameter of the circle enclosing the real cross section.

Wires having a different cross section, such as e.g. a rectangular cross section, may also be employed. These wires provide the shock absorbing device with a different buckling behavior, and hence a different energy absorbing performance, depending on the impact direction. In this case the term "size" indicates the larger lateral dimension of the wire.

With particular reference to FIGS. 2 and 3, the shock absorbing device 10 as described above may be easily deformed, e.g. bent or twisted, thanks to the grid pattern arrangement of the wavy shaped superelastic elements and to the locking restraints defined by the connection elements, thereby allowing to use it as an insert in human body protection items. Motorcyclist jackets are among the most interesting applications of the shock absorbing device of the invention.

FIGS. 1 to 3 show an embodiment of the invention according to which only the crests of the wavy shaped superelastic elements 11, 11', ..., 11", 12, 12', ..., 12" cross each other and are restrained in a locking manner e.g. two by two by respective blocks 13, 13', ..., 13".

It will be appreciated that in a fully equivalent manner the troughs of the wavy shaped superelastic elements 11, 11', ..., 11", 12, 12', ..., 12" might be restrained in a locking manner to each other instead of the crests, e.g. two by two by respective blocks 13, 13', ..., 13".

Figure 4A:
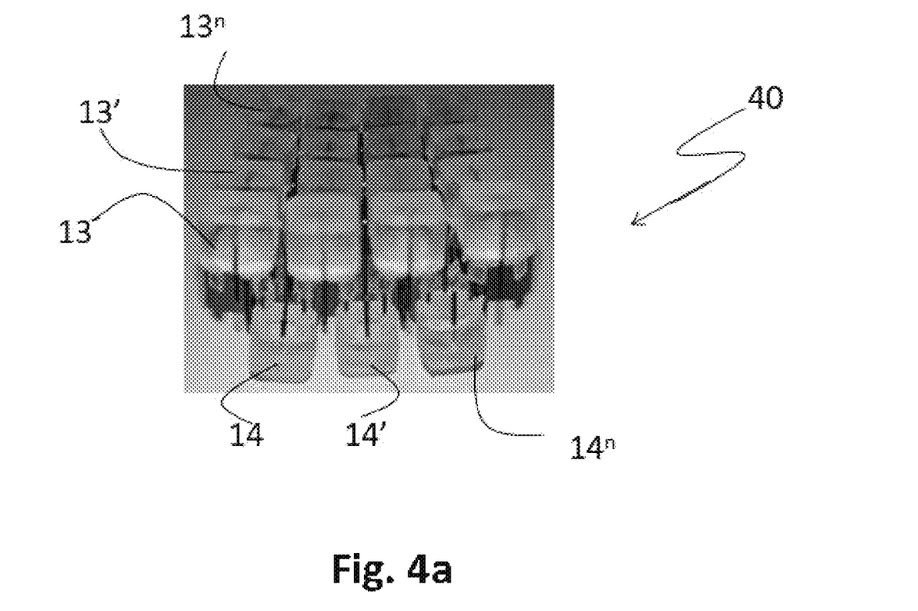
FIG. 4a is a photo showing a front view of a shock absorbing device according to another embodiment of the present invention.
Figure 4B:
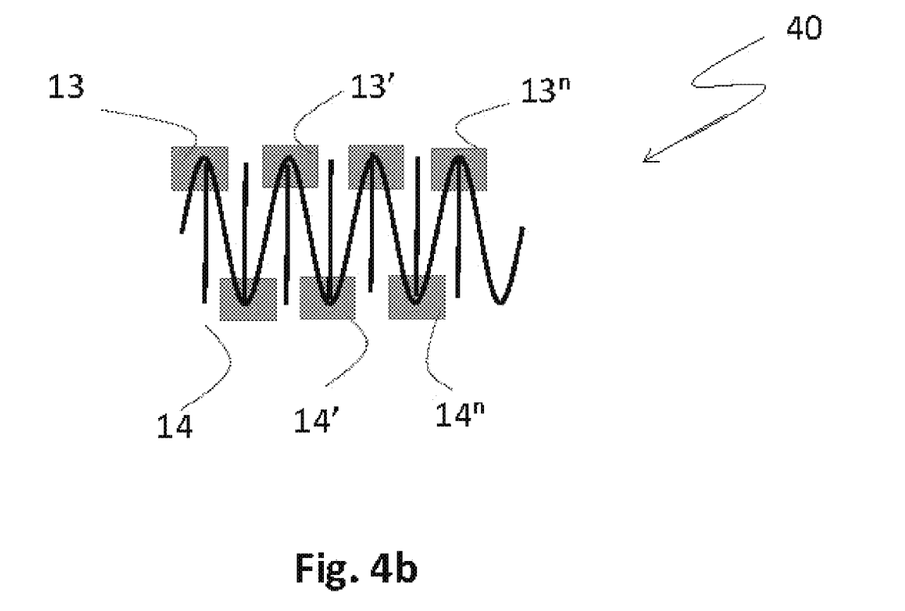

Now referring to FIGS. 4a and 4b, according to a further embodiment of the invention not only the crests, but also the troughs of the wavy shaped elements 11, 11', ..., 11", 12, 12', ..., 12" of the shock absorbing device 40 may be arranged so as to cross each other and form pairs that may be restrained in a locking manner by respective connecting elements.

As shown in FIGS. 4a and 4b, the pairs of crests are restrained in a locking manner by respective blocks 13, 13', ..., 13" as in the embodiment shown in FIGS. 1 to 3, while the pairs of troughs are restrained in a locking manner by similar further blocks 14, 14', ..., 14".

This embodiment of the invention features a structure that is still bendable but stiffer than the structure of the device according to the embodiment shown in FIGS. 1 to 3. This is due to the higher number of pairs of crossing crests and troughs restrained in a locking manner. Such structure offers the advantage of being more stable and hence suitable to withstand higher shocks if compared to the structure of the device according to the embodiment of FIGS. 1 to 3.

The deformability characterizing the shock absorbing device of the invention allows to easily adapt it to any shape and hence to arrange, fit and more generally integrate it into a shock absorbing system so that the straight portions of the wavy shaped superelastic elements are aligned in the foreseen impact direction. This allows to exploit their buckling effect as a means to absorb impact energy, i.e. their ability as slender structures to have a transition from simple compression to bending under compressive loads and impacts, with consequent large deformation and absorption of impact energy, as e.g. described in the aforementioned European patent 2,992,240.

It is important to underline that this deformability that characterizes the shock absorbing devices according to present invention is also a consequence and is achievable due to the fact that each of the locking elements connects a limited number of crests or troughs and specifically does not restrain at the same time crests and troughs.

Figure 5:
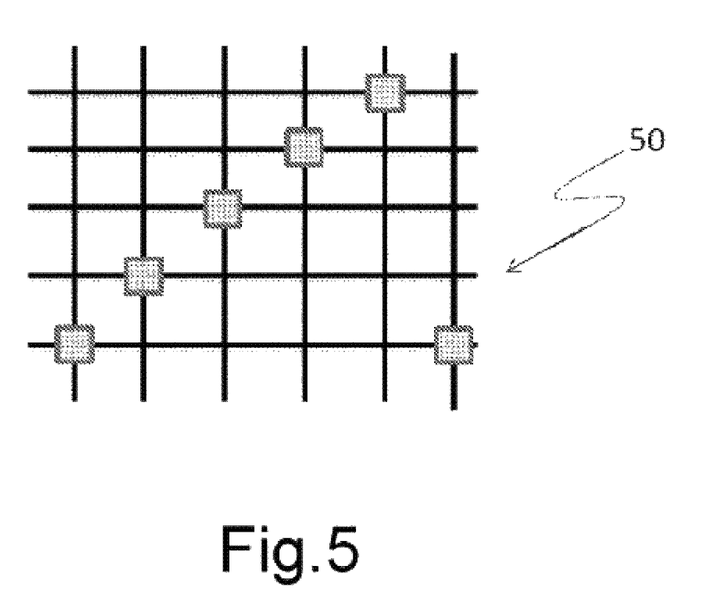
FIGS. 5, 6, 7 are top views schematically showing further embodiments of the shock absorbing device according to the present invention.
Figure 6:
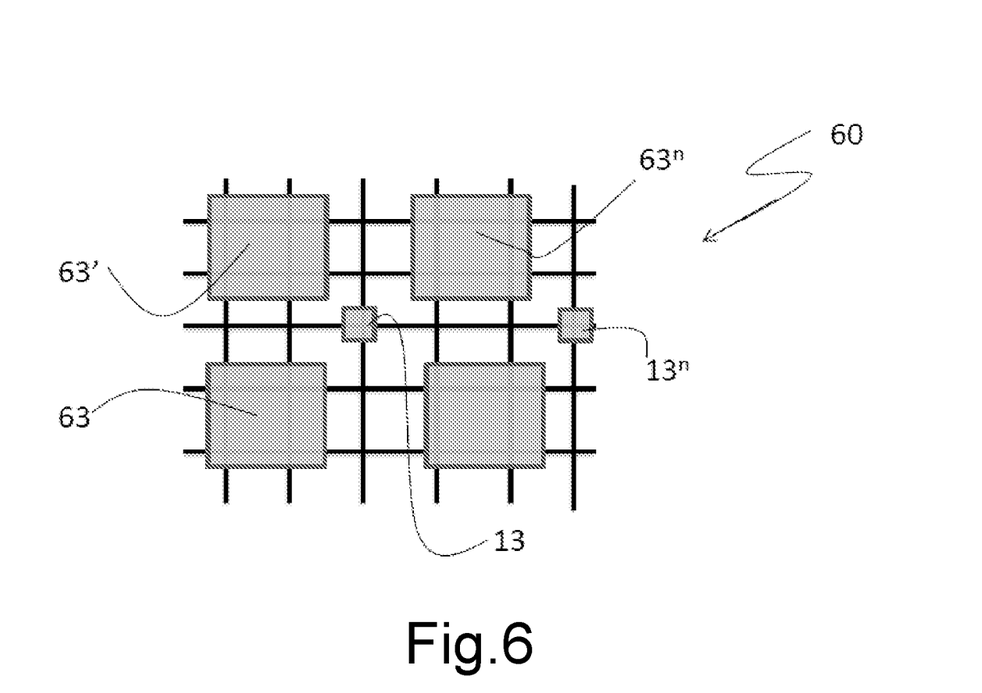
Figure 7:
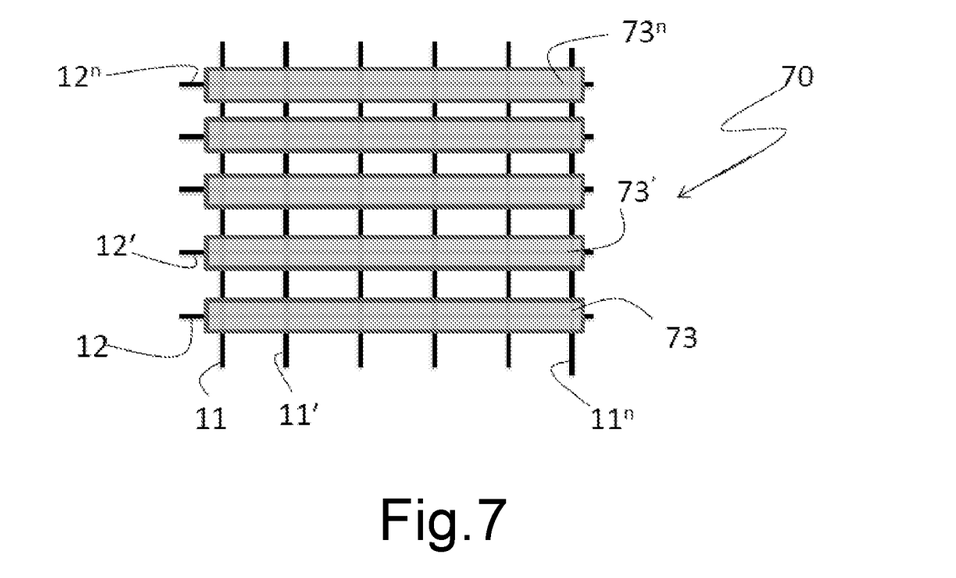

Now referring to FIGS. 5 to 7, further embodiments of the shock absorbing device according to the present invention will be disclosed.

FIG. 5 shows a shock absorbing device 50 wherein, compared to the embodiment of FIGS. 1 to 3 and 4, only a small number of pairs of crossing crests or troughs are restrained in a locking manner by connecting elements. It will be appreciated that for the purposes and effects of the present invention it is not necessary that all the pairs of crests or troughs are restrained in a locking manner.

FIG. 6 shows a shock absorbing device 60 according to another embodiment of the invention, comprising a number of first connecting elements 13, ..., 13" restraining a single pair of crests or troughs, and a number of second connecting elements 63, 63', ..., 63", restraining more pairs of crests or troughs, e.g. four pairs. The bigger connecting elements 63, 63', ... 63" define regions of the shock absorbing device having a higher capability to withstand load/shocks, because impact forces are spread over a larger area wherein the related high number of superelastic elements allows to absorb a higher amount of energy. According to a preferred embodiment of the invention square shaped blocks made of a rigid material may join 4 to 64 pair of crests or troughs.

FIG. 7 shows a shock absorbing device 70 according to a further embodiment of the invention. In this case straight blocks 73, 73', . . . , 73" made of a rigid material restrain in a locking manner a plurality of pairs of crests or troughs arranged in rows.

More particularly, the embodiment shown in FIG. 7 comprises a connecting element for each row of the grid pattern restraining in a locking manner all the pairs of crests or troughs along the respective row.

It will be appreciated that this embodiment of the shock absorbing device of the invention is highly deformable, more particularly bendable, perpendicularly to the straight blocks 73, 73', . . . , 73", whereas it is substantially not deformable in the direction along which they extend.

This embodiment of the shock absorbing device of the invention may be advantageously integrated e.g. in the back of motorcyclist jackets, where a high impact resistance is required and at the same time a high degree of bendability with respect to a given axis is needed. Still in this case superelastic elements with a non-circular cross section may advantageously be used so as to maximize energy absorption and bendability in one direction.

The invention is not limited to any specific superelastic material, even though preferred are Ni—Ti based alloy such as Nitinol. Nitinol may exhibit alternately superelastic wire behavior or shape memory alloy behavior according to its processing. The properties of Nitinol and methods allowing to achieve them are widely known to those skilled in the art, see e.g. the article "*A Study of the Properties of a High Temperature Binary Nitinol Alloy Above and Below its Martensite to Austenite Transformation Temperature*" by Dennis W. Norwich presented at the SMST 2010 conference.

The shock absorbing devices according to the present invention can be used directly as inserts in shock absorbing systems, or may comprise outer layers or elements restrained to the connecting elements, e.g. the blocks, restraining in a locking manner the pairs of crests or troughs of the wavy shaped superelastic elements. Any material may be employed to make such outer layers provided that it does not increase the structural rigidity of the device that shall essentially be determined by the connecting elements.

Outer layers can also be added with the purpose of improving the shock absorbing degree of the device, e.g. by connecting all pairs of crests or troughs so as to avoid passage of objects having a cross section smaller or comparable to the size of the connecting elements. Suitable materials for the outer layers are e.g. leather, cotton, Nylon, Elastan, Cordura® and Gore-tex® fabrics.

In a second aspect thereof the invention relates to a human body protection system incorporating one or more shock absorbing devices according to the invention. Examples of these devices include auto vehicle seats, biker garments, military vests, sporting apparels.

The present invention has been disclosed with reference to preferred embodiments thereof. It will be appreciated that further embodiments relating to the same inventive idea may exist, all encompassed within the scope of protection of the claims set forth below.

The invention claimed is:

1. A shock absorbing device (10; 40; 50; 60; 70) comprising a plurality of elements (11, 11' . . . 11", 12, 12', . . . 12") made of a superelastic Ni—Ti based alloy material, wherein said elements (11, 11' . . . 11", 12, 12', . . . 12") have a wavy shape featuring a plurality of crests and troughs between which straight portions are arranged, and wherein the elements (11, 11' . . . 11", 12, 12', . . . 12") are arranged so as to form a pattern with a plurality of pairs of crossing crests and/or crossing troughs, said shock absorbing device also comprising a plurality of connecting elements (13, 13' . . . 13"; 14, 14', . . . 14"; 63, 63', . . . 63"; 73, 73', . . . 73") configured to restrain in a locking manner a number of said pairs of crossing crests or crossing troughs, each of said connecting elements (13, 13' . . . 13"; 14, 14', . . . 14"; 63, 63', . . . 63"; 73, 73', . . . 73") locking between 1 and 72 pairs, while leaving said straight portions free to move.

2. A shock absorbing device (10; 40; 50; 60; 70) according to claim 1, wherein said connecting elements are blocks (13, 13' . . . 13"; 14, 14', . . . 14"; 63, 63', . . . 63", 73, 73', . . . 73") made of a rigid material or weld spots.

3. A shock absorbing device (10; 40; 50; 60; 70) according to claim 2, wherein said rigid material is chosen from plastics, light metals, glass wool, carbon or aramid composites.

4. A shock absorbing device (10; 40; 50; 60; 70) according to claim 1, wherein said elements made of a superelastic material (11, 11' . . . 11", 12, 12', . . . 12") are chosen from wires and tubes having a circular or rectangular cross section.

5. A shock absorbing device (10; 40; 50; 60; 70) according to claim 4, wherein said wires have a diameter or a larger lateral dimension comprised between 250 μm and 1000 μm.

6. A shock absorbing device (10; 40; 50; 60; 70) according to claim 1, wherein said pattern is a rectangular grid.

7. A shock absorbing device (10; 40; 50) according to claim 1, wherein each connecting element (13, 13' . . . 13"; 14, 14', . . . 14") restrains in a locking manner only one pair of crests or troughs.

8. A shock absorbing device (60) according to claim 1, comprising connecting elements (63, 63', . . . , 63") having a square shape, each of said connecting elements (63, 63', . . . , 63") restraining in a locking manner 4 to 64 pairs of crests or troughs.

9. A shock absorbing device (70) according to claim 1, comprising connecting elements (73, 73', . . . , 73") restraining in a locking manner a number of pairs of crests or troughs arranged in a row.

10. A shock absorbing device (70) according to claim 9, wherein said number of pairs of crests or troughs restrained in a locking manner by any of the connecting elements (73, 73', . . . , 73") is comprised between 2 and 72.

11. A shock absorbing device (70) according to claim 9, comprising a connecting element (73, 73', . . . , 73") for each row of the pattern and wherein each connecting element joins all the pairs of crests or troughs along the respective row.

12. A shock absorbing device (40) according to claim 1, comprising at least one connecting element (13, 13' . . . 13"; 63, 63', . . . , 63") restraining in a locking manner one or more pairs of crests and at least one connecting element (14, 14', . . . 14") restraining in a locking manner one or more pairs of troughs.

13. A human body protection system comprising a shock absorbing device (10; 40; 50; 60; 70) according to claim 1.

14. A human body protection system according to claim 13, wherein said system is a vehicle seat, a biker garment, a military vest or a sporting apparel.

15. A shock absorbing device (10; 40; 50; 60; 70) according to claim 2, wherein said elements made of a superelastic material (11, 11' ... 11", 12, 12', ... 12") are chosen from wires and tubes having a circular or rectangular cross section.

16. A shock absorbing device (10; 40; 50; 60; 70) according to claim 3, wherein said elements made of a superelastic material (11, 11' ... 11", 12, 12', ... 12") are chosen from wires and tubes having a circular or rectangular cross section.

17. A shock absorbing device (10; 40; 50; 60; 70) according to claim 2, wherein said pattern is a rectangular grid.

18. A shock absorbing device (10; 40; 50; 60; 70) according to claim 3, wherein said pattern is a rectangular grid.

19. A shock absorbing device (10; 40; 50; 60; 70) according to claim 4 wherein said pattern is a rectangular grid.

20. A shock absorbing device (10; 40; 50; 60; 70) according to claim 5, wherein said pattern is a rectangular grid.

\* \* \* \* \*